United States Patent [19]

Mihara

[11] Patent Number: 4,478,497
[45] Date of Patent: Oct. 23, 1984

[54] ATTACHMENT LENS SYSTEM

[75] Inventor: Shinichi Mihara, Hachiooji, Japan

[73] Assignee: Olympus Optical Co., Ltd., Tokyo, Japan

[21] Appl. No.: 440,859

[22] Filed: Nov. 12, 1982

[30] Foreign Application Priority Data

Nov. 19, 1981 [JP] Japan .................... 56-184439

[51] Int. Cl.³ .................... G02B 9/64; G02B 15/02
[52] U.S. Cl. .................... 350/476; 350/422; 350/469
[58] Field of Search .................... 350/476, 469, 422

[56] References Cited

U.S. PATENT DOCUMENTS 4,206,971 6/1980 Hamanishi et al. .................... 350/465

FOREIGN PATENT DOCUMENTS 51-12421 4/1976 Japan .
55-42726 11/1980 Japan .
56-39513 4/1981 Japan .

Primary Examiner—John K. Corbin
Assistant Examiner—Rebecca D. Gass
Attorney, Agent, or Firm—Cushman, Darby & Cushman

[57] ABSTRACT

An attachment lens system arranged to be used by attaching on the image side of a master lens system and comprising a front lens group and a rear lens group wherein the front lens group comprises first and second lens components and the rear lens group comprises a third lens component, the first lens component being a cemented doublet consisting of a negative meniscus lens and a biconvex lens and having positive refractive power, the second lens component being a biconcave lens, the third lens component comprising two lens elements, i.e., a biconvex lens and a biconcave lens, the attachment lens system enabling to use it in combination with a large aperture ratio telephoto lens system of F/2.0 class and having favorably corrected Petzval's sum, spherical aberration, coma and so forth.

8 Claims, 8 Drawing Figures

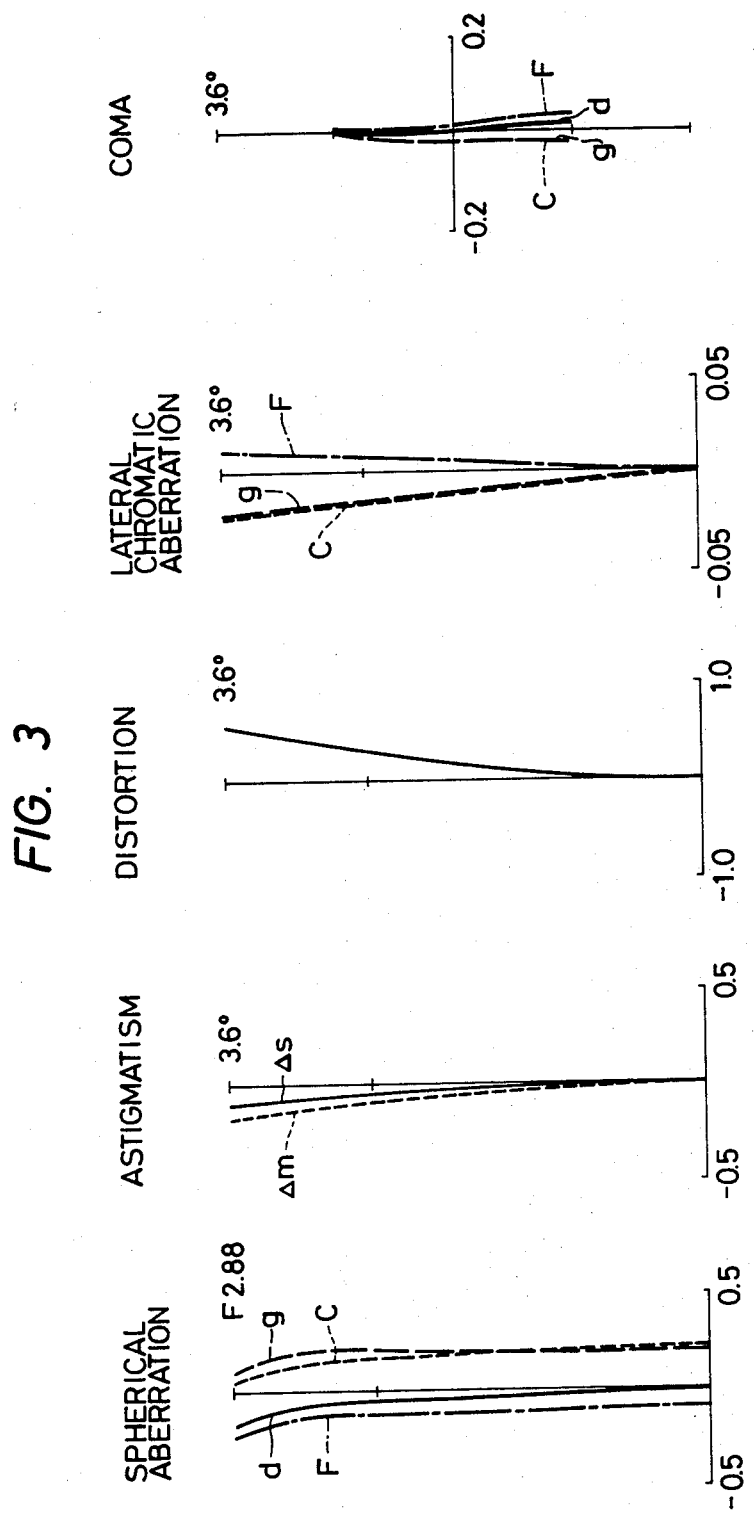

ATTACHMENT LENS SYSTEM

BACKGROUND OF THE INVENTION (a) Field of the Invention

The present invention relates to an attachment lens system to be used by attaching on the image side of a photographic lens system and thereby extending the focal length.

(b) Description of the Prior Art

An attachment lens system, which is to be used by attaching on the image side of a photographic lens system and thereby extending the focal length, is generally attached so that it comes to a position near the image position of a master lens system because the attachment lens system has negative refractive power and, moreover, there are mechanical restrictions, for example it is necessary to prevent interference between the master lens system and attachment lens system. Therefore, an attachment lens system generally becomes a lens system having strong negative refractive power and, consequently, Petzval's sum tends to become a negative value with a large absolute value. When designing this kind of attachment lens systems, it is therefore important to make Petzval's sum as small as possible.

Known attachment lens systems for this purpose are chiefly arranged to make the focal length of the master lens twice or 1.4 times. Out of them, attachment lens systems for twice (attachment lens systems for making the focal length of the master lens system twice) have such advantages that they are light in weight and are capable of easily making the focal length twice. On the other hand, these attachment lens systems have such disadvantages that, when the attachment lens system is attached to the master lens, the brightness of the overall lens system becomes one-fourth of the brightness of the master lens system and, moreover, the quality of image generally decreases. In most cases, this decrease in the quality of image is caused due to the fact that Petzval's sum becomes a negative value with a large absolute value because the attachment lens system has strong negative refractive power as described in the above and, as a result, astigmatic difference occurs. To prevent the above-mentioned decrease in the quality of image, a known attachment lens system disclosed in Japanese published examined patent application No. 12421/76 is arranged that the attachment lens system comprises a front lens group having negative refractive power and rear lens group having positive refractive power, the distance between the principal point of the front lens group and principal point of the rear lens group is made large so that the principal point of the attachment lens system as a whole is shifted toward the object side to a position of large distance from the position of the image formed by the master lens system, and the power of the attachment lens system is thereby made weak.

In case of the attachment lens system arranged as described in the above, lens configuration of the attachment lens system becomes more asymmetrical when the distance between the principal points of the front and rear lens groups is made larger and, consequently, coma tends to occur.

On the other hand, in case of attachment lens systems for 1.4 times (attachment lens system for making the focal length of the master lens system 1.4 times), powers are considerably weaker compared with powers of attachment lens systems for twice. Therefore, for attachment lens systems for 1.4 times, it is possible to make Petzval's sum satisfactorily small appropriately distributing the refractive indices to respective lenses constituting the lens system. Consequently, it is not necessary to make the distance between the principal points of the front and rear lens groups so large unlike the aforementioned known attachment lens system. This means that it is possible to make the distance between the principal points small so that coma will not be caused and to obtain an image of high quality even when the attachment lens system is used together with a master lens system having a large aperture ratio.

Known attachment lens system for 1.4 times are disclosed, for example, in Japanese published examined patent application No. 42726/80 and Japanese published unexamined patent application No. 39513/81. Out of them, the former discloses an attachment lens system with five-component five-element lens configuration which can be used together with a master lens system having a large aperture ratio of F/2.0 class. In case of this lens system, both of the front and rear lens groups are arranged as diverging lens groups. Therefore, the principal point of the attachment lens system comes to a position too close to the image surface and, as a result, the negative residual value of Petzval's sum becomes large. The attachment lens system disclosed in the latter has three-component four-element lens configuration. In case of this lens system, the principal point comes to a position of larger distance from the image surface compared with the attachment lens system disclosed in the former and, therefore, the residual value of Petzval's sum becomes small. However, this attachment lens system can be used only with a master lens system having an aperture ratio smaller and F/2.8.

SUMMARY OF THE INVENTION

It is, therefore, a primary object of the present invention to provide an attachment lens system which is to be used by mounting in rear of a master lens system and which is suitable for the use in combination with a telephoto lens system having a large aperture ratio of F/2.0 class and high performance.

The attachment lens system according to the present invention is arranged that the principal point thereof is shifted toward the object side, within the range that the symmetry of lens configuration is not disturbed, in order to favourably correct aberrations, especially Petzval's sum, spherical aberration and coma. Therefore, the attachment lens system according to the present invention is intended for the use only with master lenses having long back focal lengths and is arranged so that the attachment lens system is located in a position slightly closer to the object compared with the image position of the master lens system.

The attachment lens system according to the present invention comprises front and rear lens groups wherein said front lens group comprises first and second lens groups in the order from the object side and said rear lens group comprises a third lens component, said first lens component being a cemented doublet consisting of a negative meniscus lens arranged to be convex toward the object side and a biconvex lens and having positive refractive power, said second lens component being a biconcave lens, said third lens component comprising two lens elements, i.e., a biconvex lens and a biconcave lens, which may be cemented together or arranged separately from each other the attachment lens system according to the present invention being further arranged to fulfill the conditions (1) through (4) shown below:

(1) $-0.1 < e/|f| < 0.1$
(2) $0.15 < \Sigma d/|f| < 0.4$
(3) $d_5/\Sigma d < 0.27$
(4) $r_6 < -r_7$ wherein reference symbol e represents the distance between the principal points of the front and rear lens groups, reference symbol $\Sigma d$ represents the distance from the first lens surface to the final lens surface (i.e., the overall length of the lens system), reference symbol $d_5$ represents the airspace between the second lens component and third lens component, reference symbols $r_6$ and $r_7$ respectively represent radii of curvature of respective surfaces of the biconvex lens arranged on the object side in the third lens component (when the third lens component is arranged as a cemented doublet, $r_6$ and $r_7$ respectively represent radii of curvature of the surface on the object side and cemented surface of said lens component), and reference symbol f represents the focal length of the lens system as a whole.

Now, reasons why the above-mentioned conditions are established are described below.

In case of a tele-converter for 1.4 times like the attachment lens system according to the present invention, it is not necessary to make the distance between the principal point of the front lens group and principal point of the rear lens group so large as in case of the known lens system according to Japanese published examined patent application No. 12421/76. To correct coma favourably, it is rather preferable to make the above-mentioned distance between the principal points small. That is, if $e/|f|$ becomes larger than the upper limit of the condition (1), it becomes impossible to correct coma favourably. If, on the contrary, $e/|f|$ becomes smaller than the lower limit of the condition (1), Petzval's sum becomes a negative value with a large absolute value, and this is not preferable.

The condition (2) defines the overall length $\Sigma d$ of the lens system in relation of the focal length f of the lens system as a whole. One of objects for providing an attachment lens system is to provide an attachment lens system which is small in size and convenient for carrying. If $\Sigma d/|f|$ becomes larger than the upper limit of the condition (2), it becomes impossible to make the lens system compact. If $\Sigma d/|f|$ becomes smaller than the lower limit of the condition (2), it becomes necessary to make powers of respective lenses constituting the lens system strong. As a result, spherical aberration and other aberrations tend to become unfavourable.

The condition (3) defines the ratio of the airspace between the second lens component and third lens component to the overall length of the lens system. It is preferable to make the airspace $d_5$ as small as possible unless there occurs inconvenience in mechanical point of view. If $d_5$ becomes large and exceeds the upper limit of the condition (3), coma becomes unfavourable.

If it becomes $r_6 > -r_7$ in the condition (4), coma becomes unfavourable.

When the attachment lens system according to the present invention is arranged to further fulfill the following conditions (5) through (7) in addition to the above-mentioned conditions (1) through (4), it is possible to obtain a more favourable attachment lens system.

(5) $0.5 < (n_1-n_2)\cdot|f|/r_2 < 1.3$
(6) $0.16 < (d_3+d_4+d_5)/\Sigma d < 0.4$
(7) $n_2, n_4 < 1.62, n_1, n_3, n_5 > 1.65$ In the conditions (5) through (7) shown in the above, reference symbol $r_2$ represents the radius of curvature of the cemented surface of the first lens component, reference symbol $d_3$ represents the airspace between the first lens component and second lens component, reference symbol $d_4$ represents the thickness of the second lens component, and reference symbols $n_1$, $n_2$, $n_3$, $n_4$ and $n_5$ respectively represent refractive indices of respective lenses.

Out of the above-mentioned conditions, the condition (5) defines the power of the cemented surface of the first lens component. If the value defined by the condition (5) becomes larger than the upper limit thereof, spherical aberration and coma tend to occur. If, on the contrary, the value defined by the condition (5) becomes smaller than the lower limit thereof, Petzval's sum becomes a negative value with a large absolute value, and this is not desirable.

The condition (6) defines the length from the surface on the image side of the first lens component to the surface on the object side of the third lens component. If the value defined by the condition (6) becomes larger than the upper limit thereof, coma is caused. If, on the contrary, the value defined by the condition (6) becomes smaller than the lower limit thereof, Petzval's sum becomes a negative value with a large absolute value.

The condition (7) defines the refractive indices of glass materials to be used for respective lenses. To correct Petzval's sum toward "plus" side, it is preferable to make the refractive indices $n_2$ and $n_4$ of the convex lenses smaller than 1.62 and refractive indices $n_1$, $n_3$ and $n_5$ of the concave lenses larger than 1.65.

BRIEF DESCRIPTION OF THE DRAWINGS

FIGS. 3 through 6 respectively show graphs illustrating aberration curves of Embodiments 1 through 4 of the present invention;

DETAILED DESCRIPTION OF THE PREFERRED EMBODIMENTS

Preferred embodiments of the attachment lens system according to the present invention described so far are not shown below.

Embodiment 1

$r_1 = 460.8326$
$d_1 = 1.5$  $n_1 = 1.83481$  $\nu_1 = 42.72$
$r_2 = 32.6166$
$d_2 = 7.1$  $n_2 = 1.59270$  $\nu_2 = 35.29$
$r_3 = -73.6978$
$d_3 = 6.5$
$r_4 = -71.8850$
$d_4 = 1.5$  $n_3 = 1.78800$  $\nu_3 = 47.43$
$r_5 = 155.6632$
$d_5 = 0.2$
$r_6 = 50.1473$
$d_6 = 6.5$  $n_4 = 1.51742$  $\nu_4 = 52.41$

-continued $r_7 = -67.0862$
$d_7 = 1.0$
$r_8 = -92.9962$
$d_8 = 2.0$  $n_5 = 1.81554$  $\nu_5 = 44.5$
$r_9 = 217.1568$ $f = -125.702, \frac{e}{|f|} = -0.0396,$ $\Sigma d = 26.3, (n_1 - n_2) \cdot |f|/r_2 = 0.9331$ Embodiment 2
$r_1 = 149.6302$
$d_1 = 1.5$  $n_1 = 1.81554$  $\nu_1 = 44.45$
$r_2 = 28.5786$
$d_2 = 7.388$  $n_2 = 1.59270$  $\nu_2 = 35.29$
$r_3 = -90.9828$
$d_3 = 1.8$
$r_4 = -150.7204$
$d_4 = 1.5$  $n_3 = 1.77250$  $\nu_3 = 49.66$
$r_5 = 72.2381$
$d_5 = 5.0$
$r_6 = 39.0715$
$d_6 = 6.308$  $n_4 = 1.51633$  $\nu_4 = 64.15$
$r_7 = -89.6511$
$d_7 = 0.5$
$r_8 = -93.7935$
$d_8 = 2.0$  $n_5 = 1.77250$  $\nu_5 = 49.66$
$r_9 = 107.6032$ $f = -130.910, \frac{e}{|f|} = -0.0611,$ $\Sigma d = 25.996, (n_1 - n_2) \cdot |f|/r_2 = 1.0208$ Embodiment 3
$r_1 = 244.2690$
$d_1 = 2.0$  $n_1 = 1.83481$  $\nu_1 = 42.72$
$r_2 = 30.4311$
$d_2 = 7.0$  $n_2 = 1.59270$  $\nu_2 = 35.29$
$r_3 = -80.3647$
$d_3 = 6.5$
$r_4 = -77.0602$
$d_4 = 2.0$  $n_3 = 1.80610$  $\nu_3 = 40.95$
$r_5 = 131.7992$
$d_5 = 0.2$
$r_6 = 47.9416$
$d_6 = 6.3$  $n_4 = 1.53172$  $\nu_4 = 48.90$
$r_7 = -54.4607$
$d_7 = 0.2$
$r_8 = -69.8399$
$d_8 = 2.0$  $n_5 = 1.77250$  $\nu_5 = 49.66$
$r_9 = 176.9497$ $f = -122.409, \frac{e}{|f|} = -0.0394,$ $\Sigma d = 26.2, (n_1 - n_2) \cdot |f|/r_2 = 0.9739$ Embodiment 4
$r_1 = 216.2293$
$d_1 = 1.5$  $n_1 = 1.83481$  $\nu_1 = 42.72$
$r_2 = 29.2000$
$d_2 = 7.1$  $n_2 = 1.59270$  $\nu_2 = 35.29$
$r_3 = -69.3845$
$d_3 = 4.0$
$r_4 = -89.6466$
$d_4 = 1.5$  $n_3 = 1.78800$  $\nu_3 = 47.43$
$r_5 = 88.7093$
$d_5 = 0.2$
$r_6 = 41.1260$
$d_6 = 6.5$  $n_4 = 1.51742$  $\nu_4 = 52.41$
$r_7 = -91.5695$
$d_8 = 2.0$  $n_5 = 1.79952$  $\nu_5 = 42.24$
$r_9 = 202.0904$ $f = -126.901, \frac{e}{|f|} = -0.0423$ $\Sigma d = 22.8, (n_1 - n_2) \cdot |f|/r_2 = 1.052$ In respective embodiments shown in the above, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$, $n_2$, $n_3$, $n_4$ and $n_5$ respectively represent refractive indices of respective lenses, reference symbols $\nu_1$, $\nu_2$, $\nu_3$, $\nu_4$ and $\nu_5$ respectively represent Abbe's numbers of respective lenses, and reference symbol f represents the focal length of the lens system as a whole.

Figure 7:
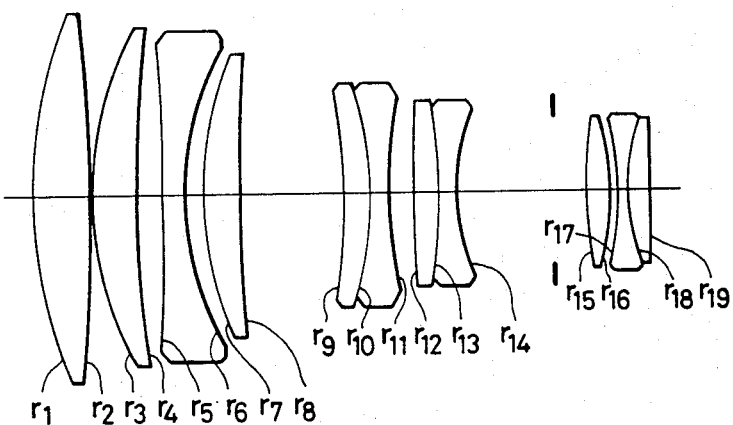
FIG. 7 shows a sectional view of an example of master lens system.
Figure 4:
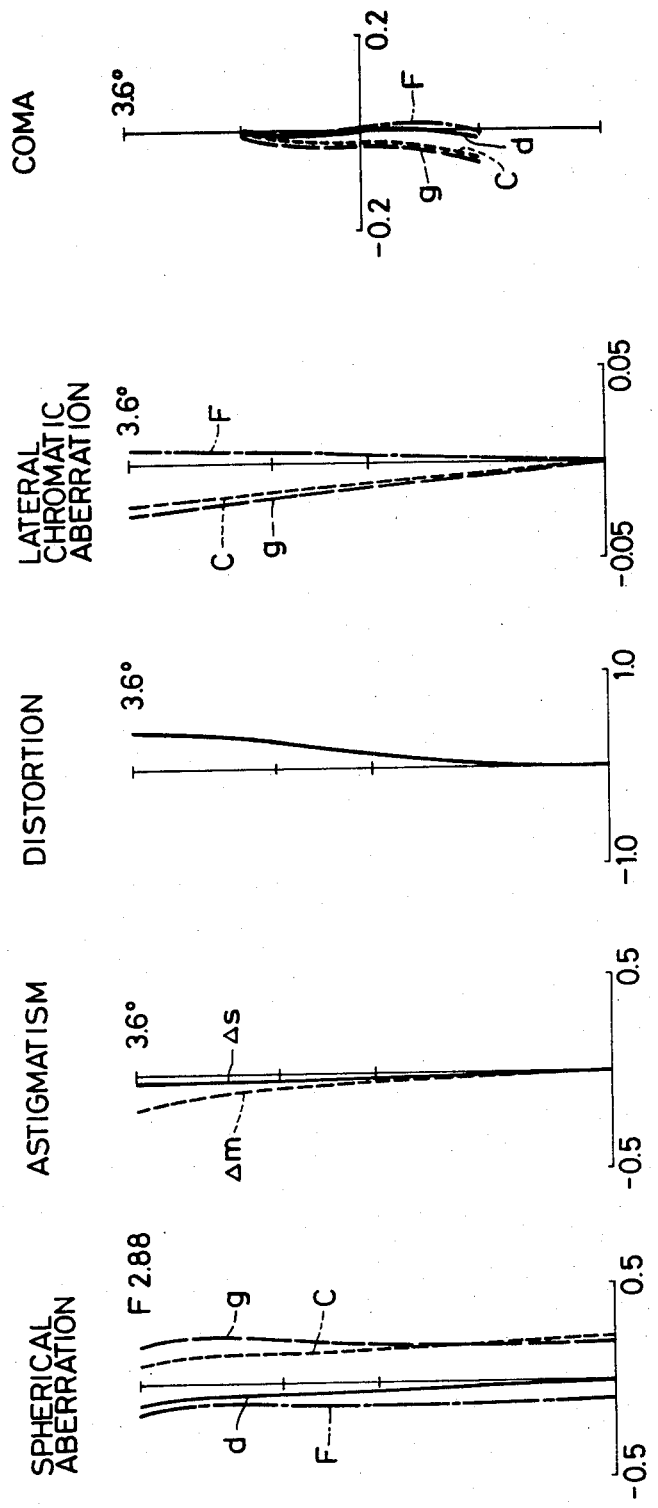
Figure 5:
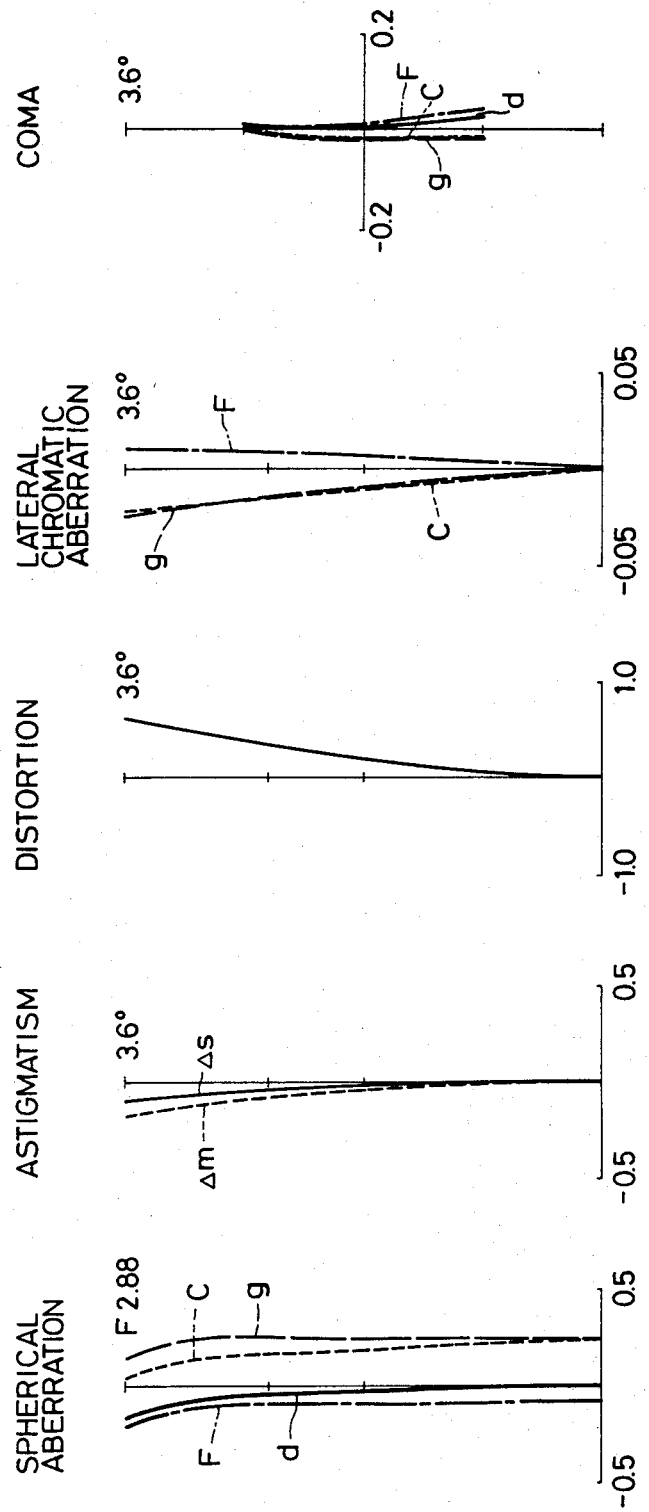
Figure 6:
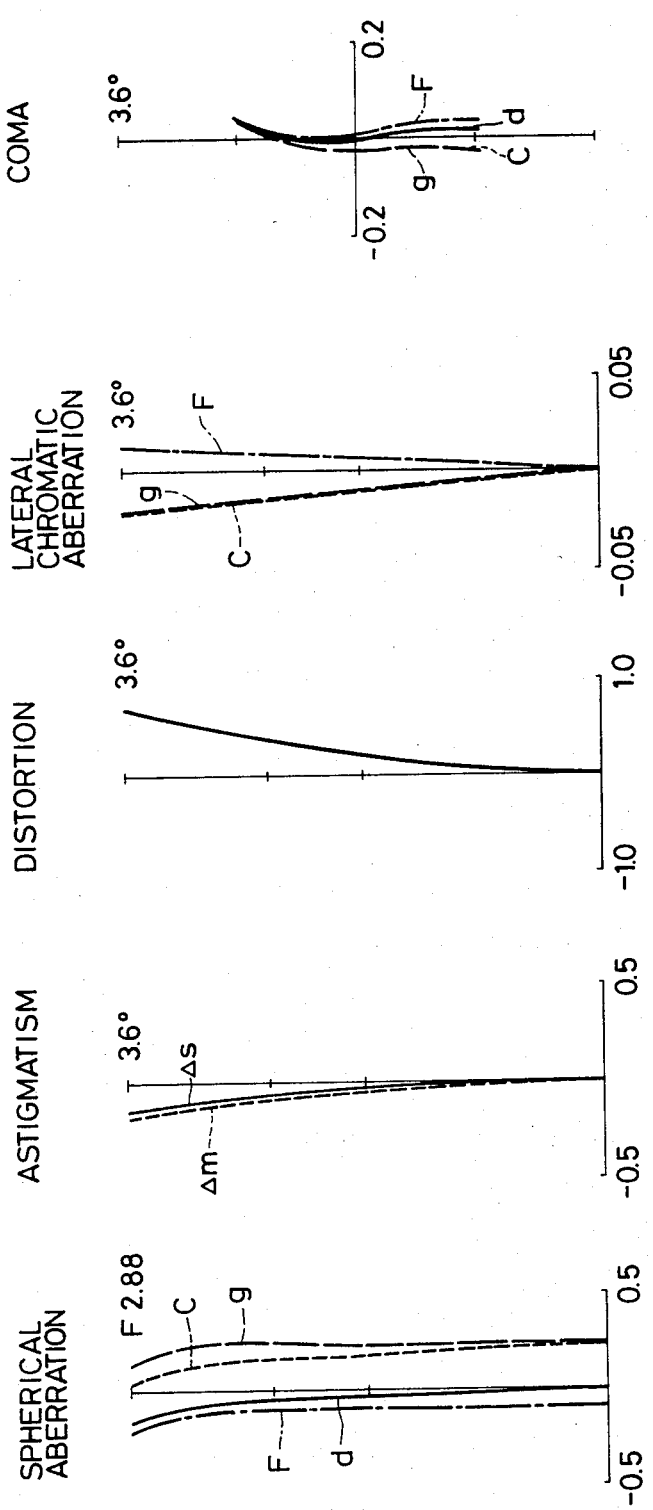
Figure 8:
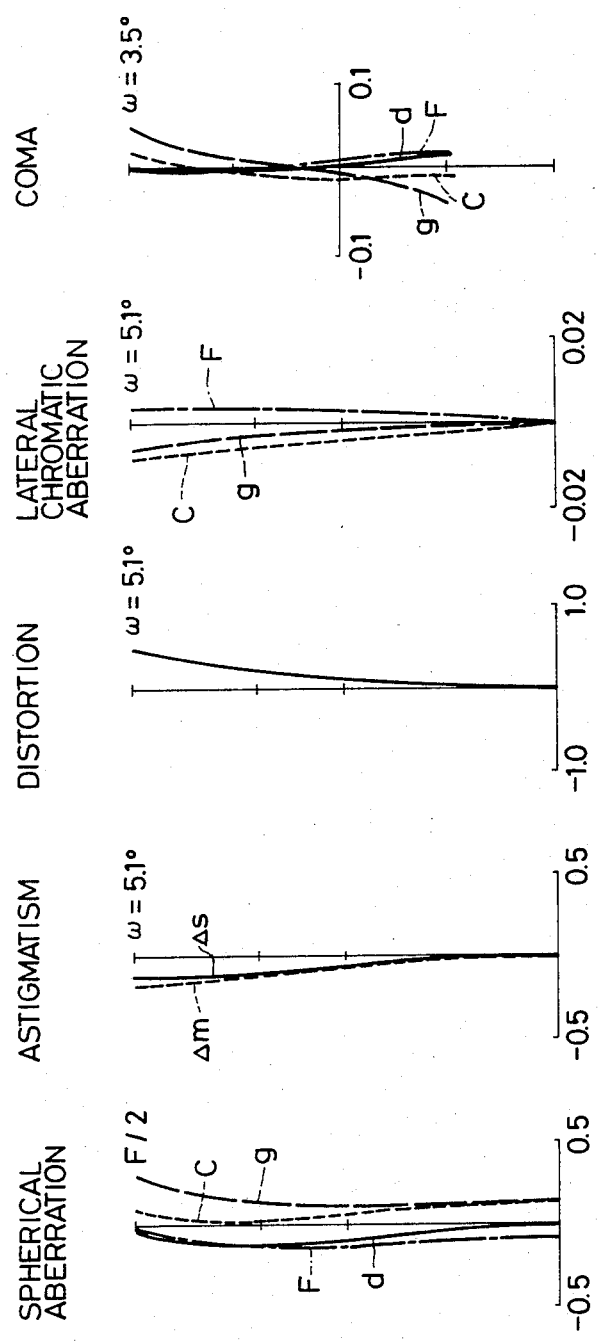
FIG. 8 shows graphs illustrating aberration curves of the above-mentioned example of master lens system.

An example of the master lens system for attaching the attachment lens system according to the present invention thereto has lens configuration as shown in FIG. 7 and has numerical data shown below.

$r_1 = 172.5356$
$d_1 = 18.0$  $n_1 = 1.60311$  $\nu_1 = 60.70$
$r_2 = -737.8629$
$d_2 = 0.4901$
$r_3 = 111.3320$
$d_3 = 16.3$  $n_2 = 1.49700$  $\nu_2 = 81.61$
$r_4 = 562.8100$
$d_4 = 7.5$
$r_5 = -1884.6020$
$d_5 = 7.5$  $n_3 = 1.63980$  $\nu_3 = 34.48$
$r_6 = 96.6270$
$d_6 = 6.9993$
$r_7 = 127.5520$
$d_7 = 12.2$  $n_4 = 1.49700$  $\nu_4 = 81.61$
$r_8 = 1391.5963$
$d_8 = 34.475$
$r_9 = -243.0338$
$d_9 = 8.7$  $n_5 = 1.73400$  $\nu_5 = 51.49$
$r_{10} = -125.9238$
$d_{10} = 7.0$  $n_6 = 1.46450$  $\nu_6 = 65.94$
$r_{11} = 184.0246$
$d_{11} = 8.18$
$r_{12} = 1625.5754$
$d_{12} = 8.5$  $n_7 = 1.68893$  $\nu_7 = 31.08$
$r_{13} = -172.9688$
$d_{13} = 6.0$  $n_8 = 1.49831$  $\nu_8 = 65.03$
$r_{14} = 75.1687$
$d_{14} = 44.0$
$r_{15} = 184.4792$
$d_{15} = 7.5$  $n_9 = 1.77250$  $\nu_9 = 49.66$
$r_{16} = -96.3731$
$d_{16} = 3.0002$
$r_{17} = -89.2549$
$d_{17} = 3.0$  $n_{10} = 1.60342$  $\nu_{10} = 38.01$
$r_{18} = 68.7166$
$d_{18} = 7.5$  $n_{11} = 1.67790$  $\nu_{11} = 55.33$
$r_{19} = -563.0149$
$f_M = 242.5, F/2$ (In the numerical data shown in the above, reference symbol $f_M$ represents the focal length of the master lens system.)

Figure 1:
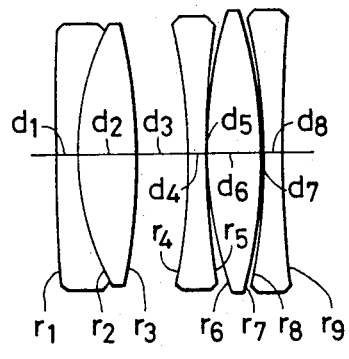
FIG. 1 shows a sectional view of Embodiments 1, 2 and 3 of the attachment lens system according to the present invention.
Figure 2:
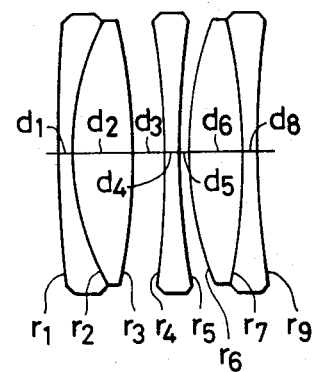
FIG. 2 shows a sectional view of Embodiment 4 of the attachment lens system according to the present invention.

Out of respective embodiments shown in the above, Embodiments 1 through 3 respectively have lens configuration as shown in FIG. 1 wherein the third lens component comprises a convex lens and a concave lens which are arranged separately from each other. Embodiment 4 has lens configuration as shown in FIG. 2 wherein the third lens component is arranged as a cemented doublet. Therefore, $r_8$ and $d_7$ are not shown in the numerical data for Embodiment 4.

Graphs of aberration curves shown in FIGS. 3 through 6 represent aberration curves of respective embodiments when they are attached to the master lens system shown in FIG. 7.

I claim:

1. An attachment lens system comprising a front lens group and a rear lens group wherein said front lens group comprises first and second lens components and said rear lens group comprises a third lens component in the order from the object side, said first lens component being a cemented doublet consisting of a negative meniscus lens arranged to be convex toward the object side and a biconvex lens and having positive refractive power, said second lens component comprising a biconcave lens, said third lens component comprising two lens elements wherein one is a biconvex lens and the other is a biconcave lens, said attachment lens system being arranged to fulfill the conditions (1) through (4) shown below:

(1) $-0.1 < e/|f| < 0.1$
(2) $0.15 < \Sigma d/|f| < 0.4$
(3) $d_5/\Sigma d < 0.27$
(4) $r_6 < -r_7$ wherein reference symbol f represents the focal length of the lens system as a whole, reference symbol e represents the distance between the principal point of the front lens group and the principal point of the rear lens group, reference symbol $\Sigma d$ represents the distance from the first lens surface to the final lens surface, reference symbol $d_5$ represents the airspace between the second lens component and third lens component, and reference symbols $r_6$ and $r_7$ respectively represent radii of curvature of the surface on the object side and surface on the image side of the third lens component (radii of curvature of the surface on the object side and cemented surface when the third lens component is arranged as a cemented doublet).

2. An attachment lens system according to claim 1 further fulfilling the conditions (5) through (7) shown below:

(5) $0.5 < (n_1 - n_2) \cdot |f|/r_2 < 1.3$
(6) $0.16 < (d_3 + d_4 + d_5)/\Sigma d < 0.4$
(7) $n_2, n_4 < 1.62, n_1, n_3, n_5 > 1.65$ wherein reference symbol $d_3$ represents the airspace between the first lens component and second lens component, reference symbol $d_4$ represents the thickness of the second lens component, reference symbol $r_2$ represents the radius of curvature of the cemented surface of the first lens component, and reference symbols $n_1$, $n_2$, $n_3$, $n_4$ and $n_5$ respectively represent refractive indices of respective lenses.

3. An attachment lens system according to claim 2 wherein said third lens component comprises a biconvex lens and a biconcave lens arranged to be separate from each other.

4. An attachment lens system according to claim 3, in which said attachment lens system has the following numerical data:

| $r_1 = 460.8326$ | | |
|---|---|---|
| $d_1 = 1.5$ | $n_1 = 1.83481$ | $\nu_1 = 42.72$ |
| $r_2 = 32.6166$ | | |
| $d_2 = 7.1$ | $n_2 = 1.59270$ | $\nu_2 = 35.29$ |
| $r_3 = -73.6978$ | | |
| $d_3 = 6.5$ | | |
| $r_4 = -71.8850$ | | |
| $d_4 = 1.5$ | $n_3 = 1.78800$ | $\nu_3 = 47.43$ |
| $r_5 = 155.6632$ | | |
| $d_5 = 0.2$ | | |
| $r_6 = 50.1473$ | | |
| $d_6 = 6.5$ | $n_4 = 1.51742$ | $\nu_4 = 52.41$ |
| $r_7 = -67.0862$ | | |
| $d_7 = 1.0$ | | |
| $r_8 = -92.9962$ | | |
| $d_8 = 2.0$ | $n_5 = 1.81554$ | $\nu_5 = 44.45$ |
| $r_9 = 217.1568$ | | |

$f = -125.702, \dfrac{e}{|f|} = -0.0396$

-continued $\Sigma d = 26.3, (n_1 - n_2) \cdot |f|/r_2 = 0.9331$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, n_3, n_4$ and $n_5$ respectively represent refractive indices of respective lenses, and reference symbols $\nu_1, \nu_2, \nu_3, \nu_4$ and $\nu_5$ respectively represent Abbe's numbers of respective lenses.

5. An attachment lens system according to claim 3, in which said attachment lens system has the following numerical data:

| $r_1 = 149.6302$ | | |
|---|---|---|
| $d_1 = 1.5$ | $n_1 = 1.81554$ | $\nu_1 = 44.45$ |
| $r_2 = 28.5786$ | | |
| $d_2 = 7.388$ | $n_2 = 1.59270$ | $\nu_2 = 35.29$ |
| $r_3 = -90.9828$ | | |
| $d_3 = 1.8$ | | |
| $r_4 = -150.7204$ | | |
| $d_4 = 1.5$ | $n_3 = 1.77250$ | $\nu_3 = 49.66$ |
| $r_5 = 72.2381$ | | |
| $d_5 = 5.0$ | | |
| $r_6 = 39.0715$ | | |
| $d_6 = 6.308$ | $n_4 = 1.51633$ | $\nu_4 = 64.15$ |
| $r_7 = -89.6511$ | | |
| $d_7 = 0.5$ | | |
| $r_8 = -93.7935$ | | |
| $d_8 = 2.0$ | $n_5 = 1.77250$ | $\nu_5 = 49.66$ |
| $r_9 = 107.6032$ | | |

$f = -130.910, \dfrac{e}{|f|} = -0.0611,$ $\Sigma d = 25.996, (n_1 - n_1) \cdot |f|/r_2 = 1.0208$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, n_3, n_4$ and $n_5$ respectively represent refractive indices of respective lenses, and reference symbols $\nu_1, \nu_2, \nu_3, \nu_4$ and $\nu_5$ respectively represent Abbe's numbers of respective lenses.

6. An attachment lens system according to claim 3, in which said attachment lens system has the following numerical data:

| $r_1 = 244.2690$ | | |
|---|---|---|
| $d_1 = 2.0$ | $n_1 = 1.83481$ | $\nu_1 = 42.72$ |
| $r_2 = 30.4311$ | | |
| $d_2 = 7.0$ | $n_2 = 1.59270$ | $\nu_2 = 35.29$ |
| $r_3 = -80.3647$ | | |
| $d_3 = 6.5$ | | |
| $r_4 = -77.0602$ | | |
| $d_4 = 2.0$ | $n_3 = 1.80610$ | $\nu_3 = 40.95$ |
| $r_5 = 131.7992$ | | |
| $d_5 = 0.2$ | | |
| $r_6 = 47.9416$ | | |
| $d_6 = 6.3$ | $n_4 = 1.53172$ | $\nu_4 = 48.90$ |
| $r_7 = -54.4607$ | | |
| $d_7 = 0.2$ | | |
| $r_8 = -69.8399$ | | |
| $d_8 = 2.0$ | $n_5 = 1.77250$ | $\nu_5 = 49.66$ |
| $r_9 = 176.9497$ | | |

$f = -122.409, \dfrac{e}{|f|} = -0.0394$

-continued $$\Sigma d = 26.2, (n_1 - n_2) \cdot |f|/r_2 = 0.9739$$

wherein reference symbols $r_1, r_2, \ldots$ respectively represent radii of curvature of respective lens surfaces, reference symbols $d_1, d_2, \ldots$ respectively represent thickness of respective lenses and airspaces between respective lenses, reference symbols $n_1, n_2, n_3, n_4,$ and $n_5$ respectively represent refractive indices of respective lenses, and reference symbols $\nu_1, \nu_2, \nu_3, \nu_4$ and $\nu_5$ respectively represent Abbe's numbers of respective lenses.

7. An attachment lens system according to claim 2 wherein said third lens component is arranged as a cemented doublet.

8. An attachment lens system according to claim 7, in which said attachment lens system has the following numerical data:

| | | |
|---|---|---|
| $r_1 = 216.2293$ | | |
| $d_1 = 1.5$ | $n_1 = 1.83481$ | $\nu_1 = 42.72$ |
| $r_2 = 29.2000$ | | |
| $d_2 = 7.1$ | $n_2 = 1.59270$ | $\nu_2 = 35.29$ |
| $r_3 = -69.3845$ | | |
| $d_3 = 4.0$ | | |
| $r_4 = -89.6466$ | | |
| $d_4 = 1.5$ | $n_3 = 1.78800$ | $\nu_3 = 47.43$ |
| $r_5 = 88.7093$ | | |
| $d_5 = 0.2$ | | |
| $r_6 = 41.1260$ | | |
| $d_6 = 6.5$ | $n_4 = 1.51742$ | $\nu_4 = 52.41$ |
| $r_7 = -91.5695$ | | |
| $d_8 = 2.0$ | $n_5 = 1.79952$ | $\nu_5 = 42.24$ |
| $r_9 = 202.0904$ | | |

$$f = -126.901, \frac{e}{|f|} = -0.0423$$

$$\Sigma d = 22.8, (n_1 - n_2) \cdot |f|/r_2 = 1.052$$

wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, n_3, n_4$ and $n_5$ respectively represent refractive indices of respective lenses, and reference symbols $\nu_1, \nu_2, \nu_3, \nu_4$ and $\nu_5$ respectively represent Abbe's numbers of respective lenses.

* * * * *